United States Patent
Ly-Gagnon et al.

(10) Patent No.: US 11,647,559 B2
(45) Date of Patent: May 9, 2023

(54) RECONNECTING WIRELESS COMMUNICATIONS LINKS ACCORDING TO A VARIABLE DUTY CYCLE

(71) Applicant: Apple Inc., Cupertino, CA (US)

(72) Inventors: Yann Ly-Gagnon, San Francisco, CA (US); Arun Unkn, Cupertino, CA (US); Chen Ganir, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/468,467

(22) Filed: Sep. 7, 2021

(65) Prior Publication Data

US 2022/0295588 A1 Sep. 15, 2022

Related U.S. Application Data

(60) Provisional application No. 63/159,934, filed on Mar. 11, 2021.

(51) Int. Cl.
*H04W 76/19* (2018.01)
*H04W 4/80* (2018.01)

(52) U.S. Cl.
CPC ............ *H04W 76/19* (2018.02); *H04W 4/80* (2018.02)

(58) Field of Classification Search
CPC ....... H04W 4/80; H04W 76/19; H04W 88/06; H04W 40/248; H04W 40/246
See application file for complete search history.

(56) References Cited

U.S. PATENT DOCUMENTS 9,769,686 B2 * 9/2017 Kang ...................... H04L 69/18
2020/0296793 A1 * 9/2020 Cheong ................. H04L 1/0003

* cited by examiner

*Primary Examiner* — Tuan H Nguyen
(74) *Attorney, Agent, or Firm* — Fish & Richardson P.C.

(57) ABSTRACT

In an example method, a mobile device establishes a first wireless communications link and a second wireless communications link with a second device, and determines that the second wireless communications link is not connected. Responsive to determining that the second wireless communications link is not connected, the mobile device attempts to reestablish the second wireless communications link with the second device according to a duty cycle that varies based at least on a characteristic associated with the first wireless communications link.

20 Claims, 7 Drawing Sheets

RECONNECTING WIRELESS COMMUNICATIONS LINKS ACCORDING TO A VARIABLE DUTY CYCLE

CROSS-REFERENCE TO RELATED APPLICATION

This application claims priority to U.S. Provisional Patent Application No. 63/159,934, filed Mar. 11, 2021, the entire contents of which is incorporated herein by reference.

TECHNICAL FIELD

The disclosure relates to systems and techniques for managing communication links, including reconnecting wireless communications links between electronic devices according to a variable duty cycle.

BACKGROUND

Electronic devices can communicate with one another through one or more wireless communications links. As an example, a first electronic device can establish a wireless communications link, such as a Bluetooth link or a Wi-Fi link, with a second electronic device. The first electronic device can transmit data to and/or receive data from the second electronic device via the wireless communications link.

SUMMARY

Systems, methods, devices and non-transitory, computer-readable media are disclosed for reconnecting one or more wireless communications links between electronic devices according to a variable duty cycle.

In some aspects, a method includes establishing with a second device, by a mobile device, a first wireless communications link and a second wireless communications link; determining, by the mobile device, that the second wireless communications link is not connected; and attempting, by the mobile device and responsive to determining that the second wireless communications link is not connected, to reestablish the second wireless communications link with the second device according to a duty cycle that varies based at least on a characteristic associated with the first wireless communications link.

Implementations of this aspect can include one or more of the following features.

In some implementations, the characteristic associated with the first wireless communications link can include a connection state of the first wireless communications link.

In some implementations, the duty cycle can have a first value when the first wireless communications link is in a connected state and a second value, different from the first value, when the first wireless communications link is in a disconnected state.

In some implementations the characteristic of the first wireless communications link can include a received signal strength value associated with the first wireless communications link.

In some implementations, the duty cycle can have a first value when the received signal strength is greater than a threshold value and a second value when the received signal strength is less than or equal to the threshold value.

In some implementations, a connection interval of the first wireless communications link can be greater than a connection interval of the second wireless communications link.

In some implementations, a sensitivity level of the first wireless communications link can be greater than a sensitivity level of the second wireless communications link.

In some implementations, an effective communications range of the first wireless communications link can be greater than an effective communications range of the second wireless communications link.

In some implementations, a data redundancy characteristic of the first wireless communications link can be greater than a data redundancy characteristic of the second wireless communications link.

In some implementations, the first wireless communications link can include a Bluetooth Low Energy Long Range (LE-LR) link or a Bluetooth Low Energy (LE) Coded Physical Layer (PHY) link.

In some implementations, the second wireless communications link can include a Bluetooth Low Energy 1 Megabit (LE-1M) link or a Bluetooth Low Energy 2 Megabit (LE-2M) link.

In some implementations, the first wireless communications link can be established responsive to determining, by the mobile device, that the mobile device is in motion.

In some implementations, the method can further include establishing the first wireless communications link responsive to determining that a received signal strength associated with the second wireless communications link is less than a threshold value.

Other implementations are directed to systems, devices and non-transitory, computer-readable media including computer-executable instructions for performing the techniques described herein.

Particular implementations provide at least the following advantages. In some cases, the implementations described herein can be used to reconnect wireless communications links between electronic devices in a power efficient and network resource efficient manner.

As an example, a first wireless communications link between a first electronic device and a second electronic device may become disconnected due to various reasons, such as an increase in the distance between the electronic devices or an increase in signal interference between the two devices. In response, the first electronic device can attempt to reconnect to the second electronic device according to a variable duty cycle, depending on the characteristics of a second power efficient "shadow" wireless communications link established between the communications device. For instance, if the characteristics of the second wireless communications link indicate that a reconnection attempt is likely to be successful, the first electronic device can attempt to reestablish the first wireless communications link according to a high duty cycle, such that communications between the two devices are resumed quickly. Further, if the characteristics of the second wireless communications link indicate that a reconnection attempt is not likely to be successful, the first electronic device can attempt to reestablish the first wireless communications link according to a low duty cycle, such that less power is consumed over time (e.g., compared to the power that would be consumed if a high duty cycle were to be used instead).

Further, when the first electronic device attempts to reconnect with the second electronic device, each attempt may degrade the network performance of the first electronic device. For example, when performing each attempt, the first electronic device may need to temporarily discontinue other wireless communications (e.g., to reduce or avoid network coexistence issues), which may slow or disrupt the transmission or reception of data. By using the techniques described herein, the first electronic device can attempt to reconnect to the second electronic device in a selective and judicious manner, such that the network performance of the first electronic device is less likely to be degraded (e.g., compared to the network performance that may be exhibited absent performance of the techniques described herein).

The details of one or more embodiments are set forth in the accompanying drawings and the description below. Other features and advantages will be apparent from the description and drawings, and from the claims.

DETAILED DESCRIPTION

Figure 1:
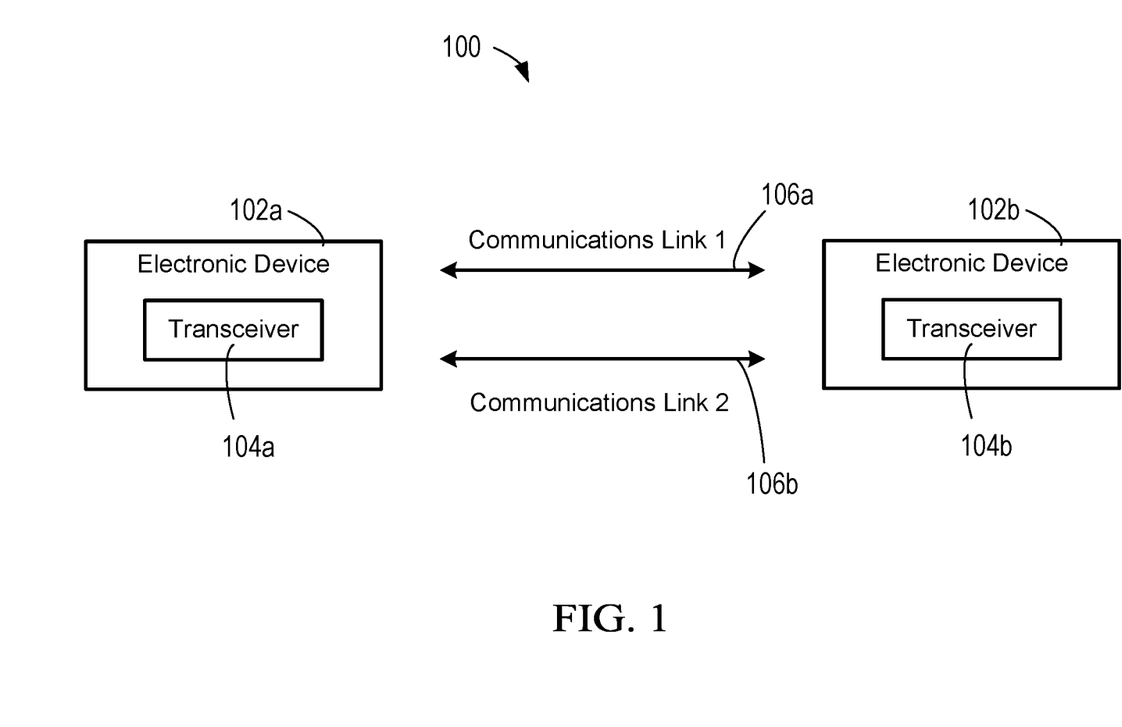
FIG. 1 is a diagram of an example system for reconnecting wireless communications links between electronic devices according to a variable duty cycle.

FIG. 1 shows an example system 100 for reconnecting wireless communications links between electronic devices according to a variable duty cycle. The system 100 includes a first electronic device 102a having a first wireless transceiver 104a, and a second electronic device 102b having a second wireless transceiver 104b.

In at least some implementations, the system 100 enables the electronic devices 102a and 102b to communicate with one another via multiple wireless communications links, e.g., concurrently or at least partially overlapping in time. Further, when one of the wireless communications links becomes disconnected, the electronic devices 102a and 102b can attempt to reconnect the disconnected wireless communications link. The reconnection can be performed according to a variable duty cycle, e.g., that varies depending on one or more characteristics of the other wireless communications link. For example, if the one or more characteristics of the other wireless communications link indicate that a reconnection attempt is likely to be successful (e.g., based on a threshold probability or other such evaluation criteria), the electronic devices 102a and 102b can attempt to reconnect the disconnected wireless communications link. In various implementations, the reconnection can be attempted according to a higher duty cycle, such that the communications between the two devices can be resumed more quickly. As another example, if the one or more characteristics of the other wireless communications link indicate that a reconnection attempt is not likely to be successful (e.g., based on a threshold probability or other such evaluation criteria), the electronic devices 102a and 102b can attempt to reconnect the disconnected wireless communications link according to a lower duty cycle, such that less power is consumed over time and such that the network performance of the electronic devices 102a and 102b is less likely to be degraded. Alternatively or additionally, if the one or more characteristics of the other wireless communications link indicate that a success likelihood of a reconnection attempt is below an attempt threshold, the reconnection attempt can be skipped or terminated. The one or more characteristics used can be selected dynamically, e.g., based on the connection(s), or can be statically configured. Further, the criteria for determining whether a reconnection attempt is likely (or not) to be successful can be selected dynamically, e.g., based on the connection(s), or can be static, and can be represented using any construct, such as one or more thresholds, one or more ranges, one or more values, combinations thereof, etc.

As described above, the electronic devices 102a and 102b can communicate with one another via one or more wireless communications links. For example, using their wireless transceivers 104a and 140b, the electronic devices 102a can establish a first wireless communications link 106a and a second communications link 106b between them. Further, the electronic devices 102a and 102b can transmit data to and/or receive data from one another via the wireless communications links 106a and 106b (e.g., by encoding the data in one or more signals and transmitting the signals wirelessly according to one or more wireless communications protocols).

In some implementations, the system 100 can be used to wirelessly control a device (e.g., a machine, vehicle, access control, etc.). For example, the first electronic device 102a can be a mobile computing device or a wearable computing device that is carried or worn by a user. Further, the second electronic device 102b can be a component or sub-system of a device, such as an electronic control system. The first electronic device 102a can store information that enables the user to gain access to and operate (e.g., start/stop) the device (e.g., one or more security tokens, certificates, or other credentials that indicate that the user of the first electronic device 102a is authorized to access and operate the device). The first electronic device 102a can establish one or more wireless communications links with the second electronic device 102b, and transmit the stored information to the second electronic device 102b over the one or more wireless communication links. The second electronic device 102b can process the received information to determine whether the user is permitted to access and operate the device, and if so, permit the user to do so. For instance, the second electronic device 102b can unlock one or more doors such that the user can open them, and enable an activation system or starter system, such that the user can start/stop the device (e.g., an engine, motor, etc.). In some implementations, the system 100 can be used to emulate or replace the functionality of a remote keyless system (e.g., a "keyless entry system" or "remote keyless ignition system") using a mobile communication device, such as a smartphone or smart watch.

Nevertheless, in practice, the electronic devices 102a and 102b can be any devices that are configured to receive, process, and transmit data. As an example, at least one of the electronic devices 102a or 102b can be a computing device, such as a client computing device (e.g., a desktop computer or a notebook computer), a server computing device (e.g., a server computer or cloud computing system), a mobile computing device (e.g., a cellular phone, smartphone, a tablet, a personal data assistant, or a notebook computer), a wearable computing device (e.g., a smart watch, a virtual reality headset, or an augmented reality headset), or other computing device capable of receiving, processing, and transmitting data. As another example, at least one of the electronic devices 102a or 102b can be a vehicle having wireless communications capabilities (e.g., a car, a truck, a motorcycle, a plane, a bicycle, a scooter, a boat, or any other vehicle that can transmit and receive data wirelessly using one or more wireless transmitters). In still other examples, at least one of the electronic devices 102a or 102b can be an access control system, a machine, an electro-mechanical device, or any combination thereof. As another example, at least one of the electronic devices 102a or 102b can be an accessory device having wireless communications capabilities (e.g., a headphone, an audio headset, an audio speaker, a camera, or a microphone, or any other accessory device that can transmit and receive data wirelessly using one or more wireless transmitters). In some implementations, at least one of the electronic devices 102a or 102b can operate using one or more operating systems (e.g., Apple macOS, Apple iOS, Microsoft Windows, Linux, Unix, Google Android, etc.) and one or more architectures (e.g., x86, PowerPC, ARM, etc.).

The wireless transceivers 104a and 104b can be configured to establish wireless communications links, and transmit and receive data via those wireless communications links according to any wireless communications protocol. In some implementations, the wireless transceivers 104a and 104b can be implemented using the wireless communications subsystems 724 described with reference to FIG. 7. Example wireless communications protocols include the Wi-Fi family of wireless network protocols (e.g., as defined by Institute of Electrical and Electronics Engineers (IEEE) 802.11 technical standards) and the Bluetooth family of wireless network protocols (e.g., as defined by technical standards developed by the Bluetooth Special Interest Group). In some implementations, at least one of the wireless communications links 106a or 106b can be a Bluetooth link (e.g., a wireless communications link established in accordance with the Bluetooth family wireless network protocols and/or technical standards, such as Bluetooth 5). In some implementations, at least one of the wireless communications links 106a or 106b can be a Wi-Fi link (e.g., a wireless communications link established in accordance with the Wi-Fi family wireless network protocols and/or technical standards, such as IEEE 802.11ac or 802.11ax). Although FIG. 1 shows each of the electronic devices 102a and 102b having a single respective wireless transceiver 104a or 104b, in practice, each of the electronic devices 102a and 102b can have any number of transceivers.

In some implementations, multiple wireless communications links can be maintained concurrently between the electronic devices 102a and 102b (e.g., two or more). Further, at least some of the wireless communications links can have different capabilities or configurations than the others, such that data can be exchanged differently across the wireless communications links. For example, the first wireless communications link 106a can be configured such that it permits data to be transmitted in a more power efficient manner between the two electronic devices 102a and 102b, according to a greater effective communications range, and/or in a more resilient manner (e.g., compared to the second wireless communications link 106b). Further, the second wireless communications link 106b can be configured such that it permits data to be transmitted more quickly between the two electronic devices 102a and 102b (e.g., compared to the first wireless communications link 106a).

In some implementations, this set of configurations enables the first wireless communications link 106a to be used as a "shadow" link between the two devices 102a and 102b (e.g., to maintain a power efficient, long range, and resilient link between the two electronic devices) and the second wireless communication link 106b to be used as a main link between the two electronic devices 102a and 102b (e.g., to transmit data more quickly between the two electronic devices). For example, the electronic devices 102a and 102b can primarily exchange data with one another using the main link, such that the data is transmitted between them more quickly. Further, in the event that the main link becomes disconnected, the electronic devices 102a and 102b can use the shadow link to determine a likelihood that the electronic devices 102a and 102b can reconnect the main link, and select an appropriate value for the variable duty cycle based on the determination.

As discussed, the first wireless communications link 106a and the second communications links 106b can have different configurations to provide the shadow and main links between the electronic devices 102 and 102b. For example, in some implementations, the first wireless communications link 106a can be configured to transmit data (e.g., data packets) periodically according to a first connection interval (e.g., a first interval of time) between each transmission, and the second wireless communications link 106b can be configured to transmit data periodically according to a second time interval (e.g., a second interval of time) between each transmission, where the first connection interval is greater than second connection interval. For instance, the first wireless communications link 106a can enable data packets to be transmitted every 400 milliseconds (or 100 milliseconds, 200 milliseconds, 500 milliseconds, etc.), and the second wireless communications link 106n can enable data packets to be transmitted every 7.5 milliseconds (or 5 milliseconds, 10 milliseconds, 20 milliseconds, etc.).

As another example, in some implementations, the first wireless communications link 106a can be configured to transmit data according to a first degree of data redundancy, and the second wireless communications link 106b can be configured to transmit data according to a second degree of data redundancy, where the first degree of data redundancy is greater than the second degree of data redundancy. For instance, the first wireless communications link 106a can transmit data such that some or all symbols or bits of the data are repeated or duplicated two or more times during a transmission interval, and the second wireless communications link 106b can transmit data such that fewer or none of the symbols or bits of the data are repeated or duplicated during a transmission interval.

As another example, in some implementations, the first wireless communications link 106a can be configured to exchange data according to a first sensitivity level, and the second wireless communications link 106b can be configured to exchange data according to a second sensitive level, where the first sensitivity level is greater than the second sensitivity level. For instance, when data is exchanged according to a relatively lower sensitivity level, a wireless signal containing the data can be decoded even when the signal strength and/or the signal-to-noise ratio of the wireless signal is relatively low (e.g., below a threshold or within a lower range of values). However, when data is exchanged according to relatively higher sensitivity level, a wireless signal containing the data can be decoded only when the signal strength and/or the signal-to-noise ratio of the wireless signal is relatively higher (e.g., above a threshold or within a higher range of values). As an example, the first wireless communications link 106a can enable data to be decoded from a wireless signal having a signal strength and/or signal to noise ratio within a first range, and the second wireless communications link 106b can enable data to be decoded from a wireless signal having a signal strength and/or signal to noise ratio within a second range, where the first range has a lower bound that is less than a lower bound of the second range.

In some implementations, the first wireless communications link 106a can be a Bluetooth Low Energy Long Range (LE-LR) link and/or a Bluetooth Low Energy Coded Physical Layer (PHY) link (e.g., configured such that each data bit that is redundantly represented by 2 symbols, 8 symbols, or some other multiple of symbols during transmission), as defined in the Bluetooth 5 technical standards developed by the Bluetooth Special Interest Group. Further, the second wireless communications link 106b can be a Bluetooth Low Energy 1 Megabit (LE-1M) or Bluetooth Low Energy 2 Megabit (LE-2M) link (e.g., configured such that each data bit that is represented by a single symbol during transmission), as defined in the Bluetooth 5 technical standards developed by the Bluetooth Special Interest Group.

In some implementations, one or more of the wireless communications links between the electronic devices 102a and 102b may become disconnected. For example, one or both of the electronic devices 102a and 102b may be moved away from one another, such that the distance between them exceeds the maximum effective communications range for one or both of the wireless communications links 106a and 106b. As another example, there may be an increase in signal interference between the two electronic devices 102a and 102b, such as electromagnetic interference (EMI), co-channel interference (CCI) (e.g., "crosstalk"), adjacent-channel interference (ACI), intersymbol interference (ISI), inter-carrier interference (ICI), common-mode interference (CMI), conducted interference, and/or signal noise.

In response to one of the wireless communications links becoming disconnected (e.g., a main link), an electronic device can attempt to scan the environment for the other device (e.g., monitor a range of frequencies for wireless signals transmitted by the other device) and attempt to reconnect the wireless communications link, e.g., according to a variable duty cycle. In particular, the variable duty cycle can vary depending on one or more characteristics of the other wireless communications link (e.g., a shadow link). Example characteristics include the connection state of the shadow link and/or the signal strength of wireless signals received by the first electronic device 102a according to the shadow link.

In some implementations, the variable duty cycle can vary in accordance with the connection state of the shadow link. To illustrate, in the example shown in FIG. 2A, the first wireless communications link 106a is a shadow link that maintains a power efficient, long range, and resilient link between the two electronic devices 102a and 102b (e.g., compared to the second wireless communication link 106b). Further, the second wireless communication link 106b is a main (or primary) link that is used to transmit control information and/or data more quickly between the two electronic devices (e.g., compared to the first wireless communications link 106a). Further, the second wireless communication link 106b has become disconnected, such as due to an increase in the distance between the electronic devices 102a and 102b and/or an increase in signal interference. However, the first wireless communications link 106a is still connected.

Figure 2A:
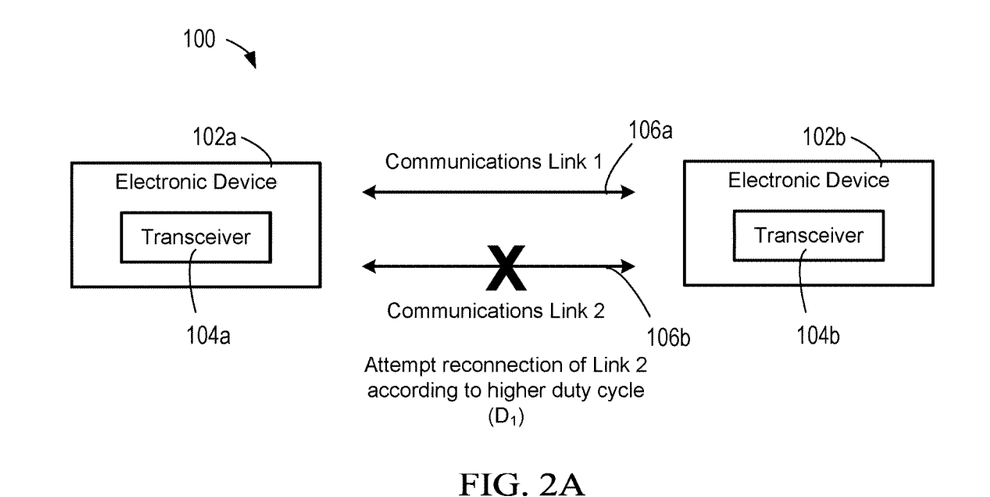
FIGS. 2A and 2B are diagrams of an example system utilizing a variable duty cycle that depends on a connection state of a shadow link between electronic devices.

In this scenario, the first electronic device 102a can attempt to reconnect the second wireless communications link 106b according to a first duty cycle $D_1$. As an example, the first duty cycle $D_1$ can be 100% (e.g., the first electronic device 102a attempts to reconnect throughout 100% of a particular time period until it successfully reconnects, or until some other stop criterion is met, such as the expiration of a time out period). For instance, during each of several 30 millisecond time intervals, the first electronic device can attempt to reconnect during the entirety of the 30 millisecond time interval. 30 milliseconds is provided as an example, but the time interval can be any appropriate interval, e.g., less than 10 milliseconds, tens of milliseconds, hundreds of milliseconds, etc. As another example, the first duty cycle $D_1$ can be 75% (e.g., the first electronic device 102a attempts to reconnect during 75% of a particular time period until it successfully reconnects, or until some other stop criterion is met, such as the expiration of a time out period). For instance, during each of several 40 millisecond time intervals, the first electronic device can attempt to reconnect during 30 milliseconds of that time interval. 40 milliseconds is provided as an example, but any appropriate interval can be used.

Figure 2B:
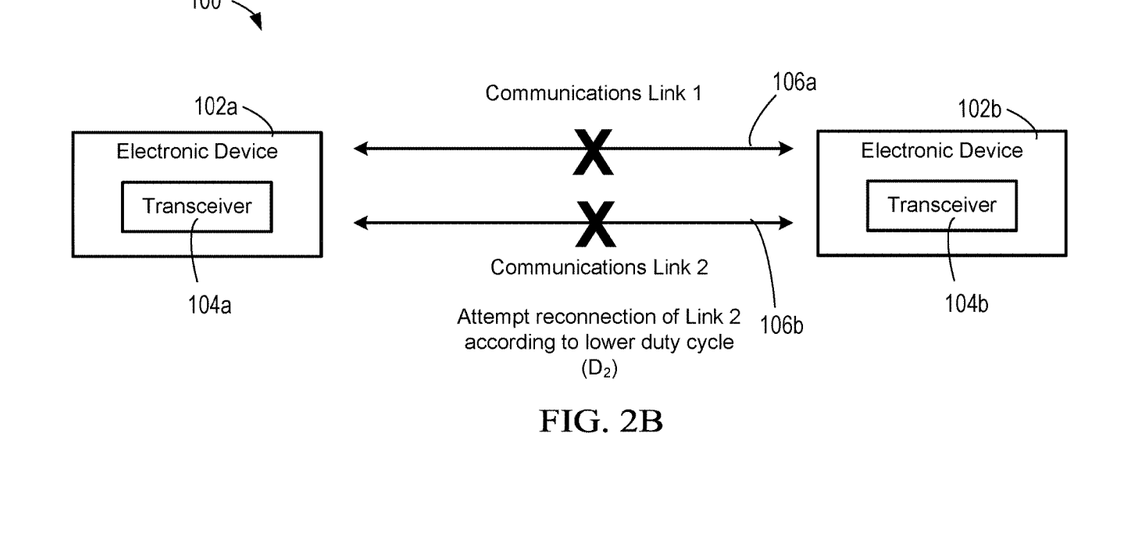

In contrast, in the example shown in FIG. 2B, the first wireless communications link 106a is also disconnected (e.g., due to the increase in the distance between the electronic devices 102a and 102b and/or an increase in signal interference). In this scenario, the first electronic device 102a can attempt to reconnect the second wireless communications link 106b according to a second duty cycle $D_2$ that is less than the first duty cycle $D_1$. As an example, the second duty cycle $D_2$ can be 10% (e.g., the first electronic device 102a attempts to reconnect during 10% of a particular time period until it successfully reconnects, or until some other stop criterion is met, such as the expiration of a time out period). For instance, during each of several 300 millisecond time intervals, the first electronic device can attempt to reconnect during 30 milliseconds of that time interval. 300 milliseconds is provided as an example, but any appropriate interval can be used.

The variation in the duty cycle is advantageous, as it enables the first electronic device 102a to attempt to reconnect to the second electronic device 102b in a power efficient manner. For example, if the first wireless communications link 106a is still in a connected state, this may indicate a reconnection attempt is likely to be successful (e.g., the electronic devices 102a and 102b are relatively close to one another and/or relatively little signal interference is present). Based on this information, the first electronic device 102a can attempt to reestablish the second wireless communications link 106b according to a high duty cycle, such that high speed and/or robust communications between the two devices are resumed quickly. Further, if the first wireless communications link 106a is also in a disconnected state, this may indicate a reconnection attempt is not likely to be successful (e.g., the electronic devices 102a and 102b are relatively far from one another and/or relatively more signal interference is present). Based on this information, the first electronic device 102a can attempt to reestablish the second wireless communications link 106b according to a low duty cycle, such that less power is consumed over time (e.g., compared to the amount of power that would be consumed if a high duty cycle were to be used instead).

Further, when the first electronic device 102*a* attempts to reconnect with the second electronic device 102*b*, an attempt may degrade the network performance of the first electronic device 102*a*. As an example, when performing an attempt, the first electronic device may need to temporarily discontinue other wireless communications (e.g., to reduce or avoid network coexistence issues), which may slow or disrupt the transmission and/or reception of data. For instance, if the second communications link 106*b* is a Bluetooth communications link, the first electronic device 102 may need to temporarily discontinue Wi-Fi communications during the reconnection attempt. By attempting to reconnect the second communications link 106*b* (e.g., the main link) according to a variable duty cycle that depends on one or more characteristics of the first wireless communications link 106*a* (e.g., the shadow link), the first electronic device 102*a* can perform one or more reconnection attempts in a selective and judicious manner, such that the network performance of the first electronic device 102*a* is less likely to be degraded (e.g., compared to the network performance that may be exhibited absent performance of the techniques described herein).

In some implementations, the variable duty cycle can vary depending on the signal strength of wireless signals received by the first electronic device 102*a* according to the shadow link. To illustrate, in the example shown in FIG. 3A, the first wireless communications link 106*a* is a shadow link that maintains a power efficient, long range, and resilient link between the two electronic devices 102*a* and 102*b* (e.g., compared to the second wireless communication link 106*b*). Further, the second wireless communication link 106*b* is a main link that is used to transmit control information and/or data between the two electronic devices (e.g., more quickly or reliably than the first wireless communications link 106*a*). Further, in the example, the second wireless communication link 106*b* has become disconnected, such as due to an increase in the distance between the electronic devices 102*a* and 102*b* and/or an increase in signal interference. However, the first wireless communications link 106*a* is still connected, and the signal strength of wireless signals received by the first electronic device 102*a* over the first wireless communications link 106*a* is relatively high (e.g., greater than a particular threshold value). In some implementations, the signal strength can be a received signal strength indication (RSSI) measured by the first electronic device 102*a*. In some other implementations, the signal strength can be a signal-to-noise ratio (SNR), signal-to-interference-and-noise ratio (SINR), or other such metric. In this scenario, the first electronic device 102*a* can attempt to reconnect the second wireless communications link 106*b* according to a first duty cycle $D_1$. As an example, the first duty cycle $D_1$ can be 100%, 75%, or some other duty cycle over a threshold, e.g., 50%.

Figure 3A:
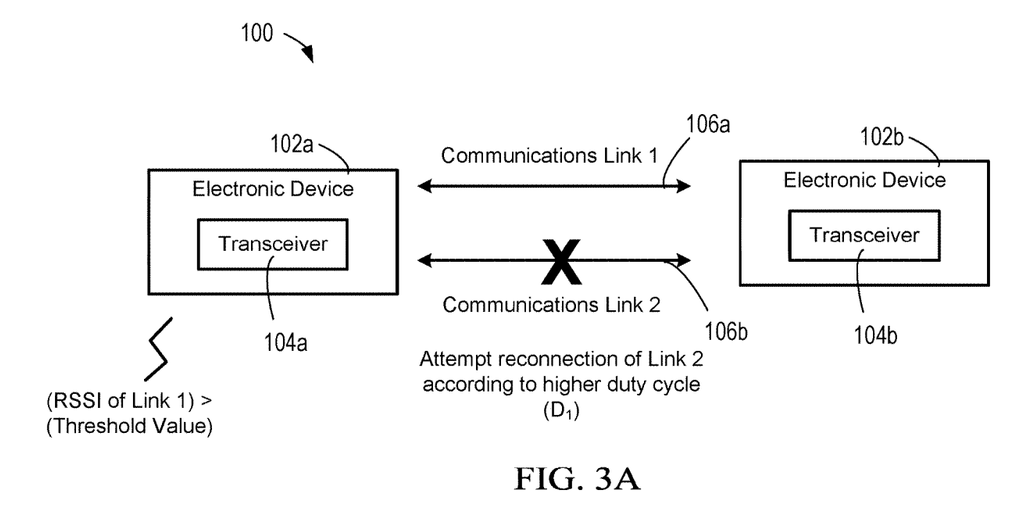
FIGS. 3A and 3B are diagrams of an example system utilizing a variable duty cycle that depends on a signal strength of the wireless signals associated with a shadow link between electronic devices.
Figure 3B:
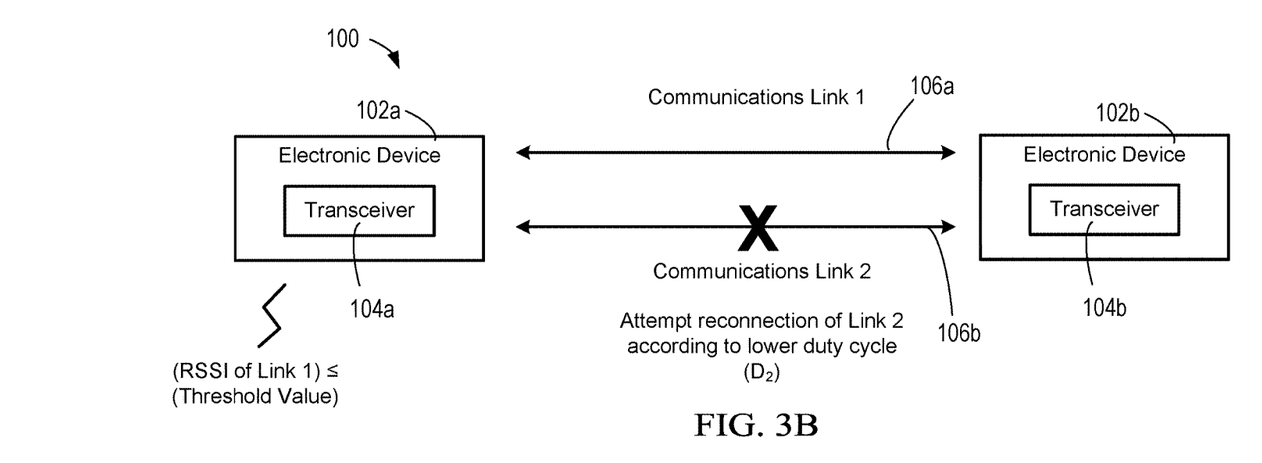

In contrast, in the sample shown in FIG. 3B, the signal strength of wireless signals received by the first electronic device 102*a* over the first wireless communications link 106*a* is relatively low (e.g., less than or equal to the threshold value). In this scenario, the first electronic device 102*a* can attempt to reconnect the second wireless communications link 106*b* according to a second duty cycle $D_2$ that is less than the first duty cycle $D_1$. As an example, the second duty cycle $D_2$ can be 25%, 10%, or some other duty cycle lower than a threshold, e.g., 50%.

In some implementations, the threshold value can be selected empirically. For instance, the threshold value can be selected based on experiments or observations regarding the likelihood that a reconnection attempt for a main link will be successful, given particular RSSI values for a shadow link. In some other implementations, the threshold value can selected dynamically, e.g., based on one or more of signal conditions, historical performance, battery level of either/both devices, etc.

The variation in the duty cycle is advantageous, as it enables the first electronic device 102*a* to attempt to reconnect to the second electronic device 102*b* in a power efficient manner. For example, if the signal strength of wireless signals communicated over the first wireless communications link 106*a* is high (e.g., greater than a threshold signal strength), this may indicate a reconnection attempt is likely to be successful (e.g., the electronic devices 102*a* and 102*b* are relatively close to one another and/or relatively little signal interference is present). Based on this information, the first electronic device 102*a* can attempt to reestablish the second wireless communications link 106*b* according to a high duty cycle, such that communications between the two devices are resumed quickly. Further, if the signal strength of wireless signals transmitted via the first wireless communications link 106*a* is low (e.g., less than a threshold signal strength), this may indicate a reconnection attempt is not likely to be successful (e.g., the electronic devices 102*a* and 102*b* are relatively far from one another and/or relatively more signal interference is present). Based on this information, the first electronic device 102*a* can attempt to reestablish the second wireless communications link 106*b* according to a low duty cycle, such that less power is consumed by attempting reconnection (e.g., compared to the amount of power that would be consumed if a high duty cycle were to be used instead). Similarly, as described above, use of the variable duty cycle can improve the network performance of the first electronic device 102*a*, such as by reducing or avoiding network coexistence issues.

In some implementations, the first electronic device 102*a* can attempt to maintain the first wireless communications link 106*a* (e.g., the shadow link) as a persistent or "always-on" connection between the two electronic devices 102*a* and 102*b*. For example, so long as conditions allow such a link to be established and maintained, the first electronic device 102*a* can do so, regardless of the state of the second wireless communications link 106*b* (e.g., the main link).

In some implementations, including optionally in the previous examples, the first electronic device 102*a* can selectively establish the first wireless communications link 106*a* (e.g., the shadow link) based on one or more characteristics of the second wireless communications link 106*b* (e.g., the main link).

Figure 4A:
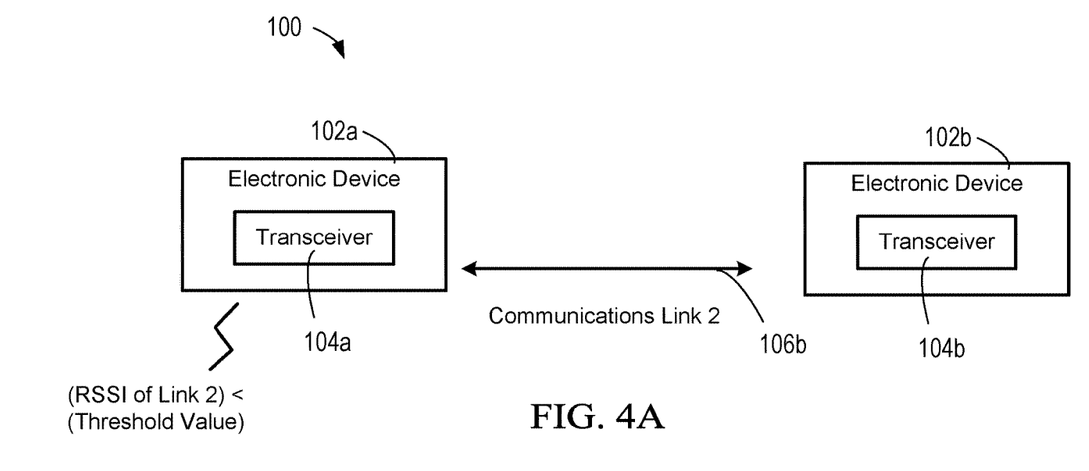
FIGS. 4A and 4B are diagrams of an example system that selectively establishes a shadow link between electronic devices based at least on a signal strength of the wireless signals associated with a main link between the electronic devices.

As an example, the first electronic device 102*a* can selectively establish the first wireless communications link 106*a* based on the signal strength of wireless signals received from the second electronic device 102*b* via the second communications link 106*b*. For instance, as shown in FIG. 4A, the first electronic device 102*a* can initially establish the second communications link 106*b* with the second electronic device 102*b*, and refrain from establishing the first wireless communications link 106*a* with the second electronic device 102*b*. Further, the first electronic device 102*a* can monitor the signal strength of the wireless signals received from the second electronic device 102*b* via the second communications link 106*b*. As an example, the signal strength can be an RSSI measured by the first electronic device 102*a*.

Figure 4B:
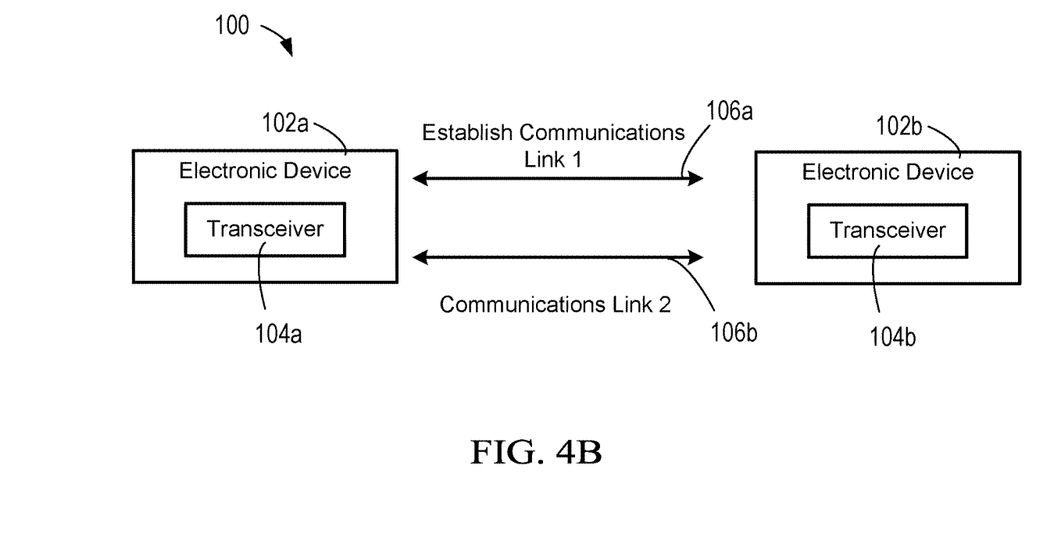

When the signal strength associated with the second communications link 106*b* is sufficiently low (e.g., less than a threshold value), the first electronic device 102*a* can selectively establish the first wireless communications link 106a (e.g., as shown in FIG. 4B). In the event that the second communications link 106b becomes disconnected, the first electronic device 102a can attempt to reconnect the second wireless communications link 106b, e.g., according to a variable duty cycle (e.g., as described with reference to FIGS. 2A-3B) determined in association with the first wireless communications link.

In some implementations, the threshold value can be selected empirically. For instance, the threshold value can be selected based on experiments or observations regarding the likelihood that a shadow link will become disconnected, given one or more RSSI values for the shadow link.

This selective establishment of the first wireless communications link 106a (e.g., the shadow link) can be advantageous, as it enables the first electronic device 102a to maintain the first wireless communications link 106a when the second communications link 106b is likely to become disconnected (e.g., when the RSSI associated with the second communications link 106b is below a threshold, within a determined range of values, or otherwise determined to be sufficiently low), and to refrain from maintaining the first wireless communications link 106a when the second communications link 106b is not likely to become disconnected (e.g., when the RSSI associated with the second communications link 106b is above a threshold, within a determined range of values, or otherwise determined to be sufficiently high). Accordingly, the first electronic device 102a can operate in a power efficient manner.

Figure 5A:
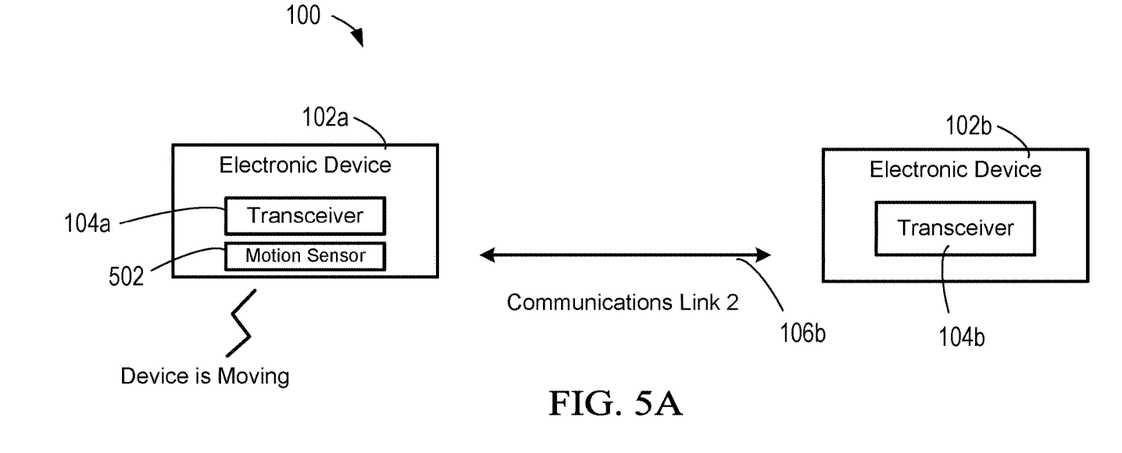
FIGS. 5A and 5B are diagrams of an example system that selectively establishes a shadow link between electronic devices based at least on a motion state of one of the electronic devices.

In some implementations, the first electronic device 102a can selectively establish the first wireless communications link 106a (e.g., the shadow link) based on a motion state of the first electronic device 102a. The motion state can be considered separately or in combination another metric, such as signal strength (described above).

For example, as shown in FIG. 5A, the first electronic device 102a can initially establish the second communications link 106b with the second electronic device 102b, and refrain from establishing the first wireless communications link 106a with the second electronic device 102b. Further, the first electronic device 102a can monitor its motion state using a motion sensor 502. In some implementations, the motion sensor 502 can include any of (or any combination of) one or more accelerometers, gyroscopes, compasses, and/or orientation sensors.

In some implementations, the motion state can indicate whether the first electronic device 102a is in motion (e.g., a moving state and a stationary state). In some implementations, the motion state can indicate the intensity with which the first electronic device 102a is in motion (e.g., a low intensity motion state, a moderate intensity motion state, a high intensity motion state, etc.). In some implementations, the motion state can indicate the type of activity that is being performed by a user that is holding or wearing the first electronic device 102a (e.g., sitting, standing, walking, jogging, running, etc.).

Figure 5B:
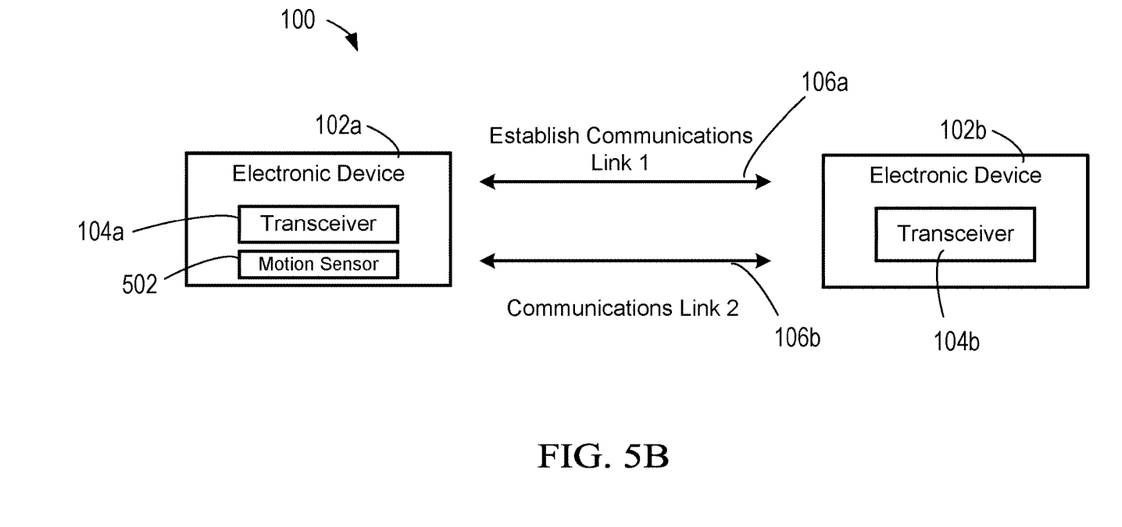

If the motion state of the first electronic device 102a satisfies certain criteria, the first electronic device 102a can selectively establish the first wireless communications link 106a (e.g., as shown in FIG. 5B). In the event that the second communications link 106b becomes disconnected, the first electronic device 102a can attempt to reconnect the second wireless communications link 106b, e.g., according to a variable duty cycle (e.g., as described with reference to FIGS. 2A-3B). As an example, the criteria can include a determination that device (and thus the user) is in motion. As another example, the criteria can include a determination that the user who is holding or wearing the first electronic device is performing a certain type of activity, such as walking, jogging, or running. As an example, the criteria can include a determination that the intensity of movement of the first electronic device is greater than a threshold intensity value.

This selective establishment of the first wireless communications link 106a (e.g., the shadow link) can be advantageous, as it enables the first electronic device 102a to maintain the first wireless communications link 106a when the second communications link 106b is likely to become disconnected (e.g., when the first electronic device 102a is in motion), and to refrain from maintaining the first wireless communications link 106a when the second communications link 106b is not likely to become disconnected (e.g., when the first electronic device 102 is not moving or is moving less than a threshold amount). Accordingly, the first electronic device 102a can operate in a power efficient manner.

The implementations described herein may be particular advantageous in wirelessly communicating with another device, e.g., for access or other such control. For example, as described above, the first electronic device 102a can be a mobile computing device or a wearable computing device that is carried or worn by a user, and the second electronic device 102b can be a component or sub-system of a device, such as an electronic control system of an access device, a vehicle, etc. Further, the user can use the first electronic device 102a to gain access to the device and to activate one or more device functions. As an example, the user can instruct the first electronic device 102a to establish the second communications link 106b (e.g., a main link) with the second electronic device 102b, and instruct the first electronic device 102a transmit commands or stored information (e.g., security credentials) to the second electronic device using the second communications link 106b.

In some cases, the device may be located nearby (e.g., within an effective communication range) the user and the first electronic device 102a, but at a location near the edge of the effective communications range of the second communications link 106b. For instance, in the example of a vehicle, the vehicle may be located in a driveway or other such parking space, and the user may be located nearby, e.g., inside of a house, business, or other such location. By performing the techniques described herein, the first electronic device 102a can attempt to reconnect the second communications link 106b according to a variable duty cycle, such that the second communications link 106b is less likely to repeatedly connect and disconnect over a period of time. Accordingly, the first electronic device 102a can operate in a power efficient manner and in a manner that is less likely to degrade its network performance (e.g., compared to the power efficiency and/or network degradation that may occur absent performance of one or more of the techniques described herein).

Nevertheless, the implementations described herein may also be advantageous in facilitating power efficient communications between any electronic devices, such as computing devices, other types of vehicles, accessory and/or accessory devices.

Figure 6:
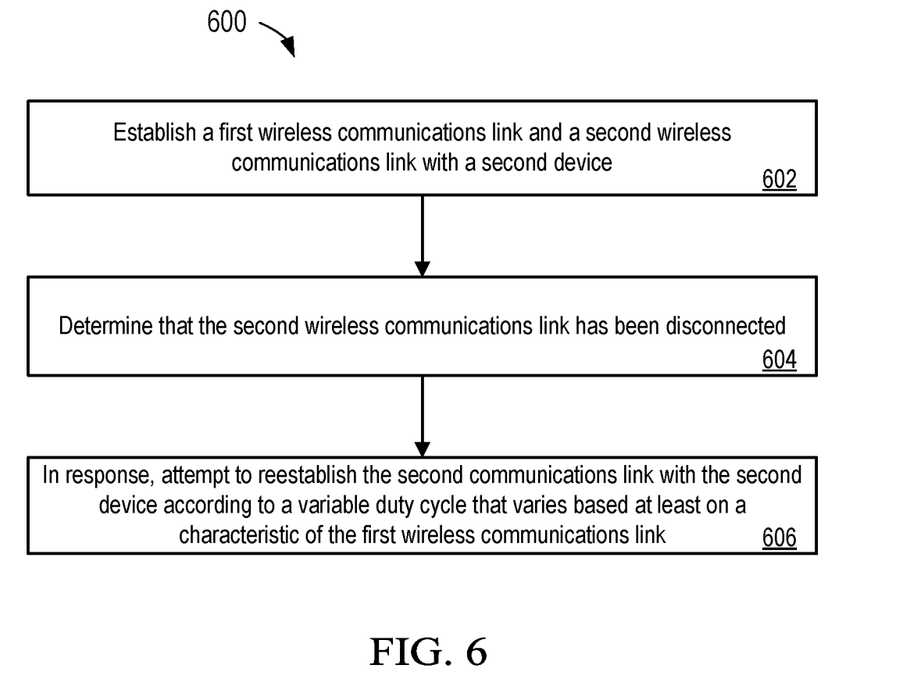
FIG. 6 is a flow chart diagram of an example process for reconnecting wireless communications links between electronic devices according to a variable duty cycle.

FIG. 6 shows an example process 600 for reconnecting wireless communications links between electronic devices according to a variable duty cycle. The process 600 can be performed for example, one or more of the components of the system 100 shown in FIGS. 1-5 and 7 (e.g., the first electronic device 102a and/or the second electronic device 102b).

In the process 600, a mobile device establishes a first wireless communications link and a second wireless communications link with a second device (block 602). As an example, the mobile device can be the first electronic device 102a, and the second device can be the second electric device 102b, as described above.

In some implementations, the second device can be (or can be included in) a vehicle, an access control system, an electro-mechanical device, etc. As an example, the second device can be a component of a vehicle that controls one or more door locks, ignition systems, starter systems, or other systems of the vehicle based on wireless signals transmitted by the mobile device.

In some implementations, the mobile device and/or the second device can be a computing device, such as a client computing device, a server computing device, a mobile computing device, a wearable computing device, or other computing device capable of receiving, processing, and transmitting data. In some implementations, the mobile device and/or the second device can be an accessory device having wireless communications capabilities.

In some implementations, a connection interval of the first wireless communications link can be greater than a connection interval of the second wireless communications link. In some implementations, a sensitivity level of the first wireless communications link can be greater than a sensitivity level of the second wireless communications link. In some implementations, an effective communications range of the first wireless communications link can be greater than an effective communications range of the second wireless communications link. In some implementations, a data redundancy characteristic of the first wireless communications link can be greater than a data redundancy characteristic of the second wireless communications link.

In some implementations, the first wireless communications link can include a first Bluetooth link, and the second wireless communications link can include a second Bluetooth link. As examples, the first Bluetooth link can include a Bluetooth Low Energy Long Range (LE-LR) link or a Bluetooth Low Energy (LE) Coded Physical Layer (PHY) link. As further examples, the second Bluetooth link can include a Bluetooth Low Energy 1 Megabit (LE-1M) link or a Bluetooth Low Energy 2 Megabit (LE-2M) link.

Further, the mobile device determines that the second wireless communications link is not connected (block 604). For example, the mobile device determines that the second wireless communications link has been disconnected.

Responsive to determining that the second wireless communications link is not connected, the mobile device attempts to reestablish the second wireless communications link with the second device according to a duty cycle. The duty cycle can vary based at least on a characteristic associated with the first wireless communications link (block 606).

In some implementations, the characteristic associated with the first wireless communications link can include a connection state of the first wireless communications link. Further, the duty cycle can have a first value when the first wireless communications link is in a connected state, and the duty cycle can have a second value, different from the first value, when the first wireless communications link is in a disconnected state. For example, the first value can be greater than the second value.

In some implementations, the characteristic associated with the first wireless communications link can include a received signal strength value associated with the first wireless communications link. The received signal strength value can be measured by the mobile device. Further, the duty cycle can have a first value when the received signal strength value is greater than a threshold value, and the duty cycle can have a second value when the received signal strength value is less than or equal to the threshold value. The first value can be greater than the second value. In some implementations, multiple different threshold values can be implemented.

In some implementations, the process 600 can alternatively or additionally include determining, by the mobile device, that the mobile device is in motion. Further, the first wireless communications link can be established responsive to determining that the mobile device is in motion.

In some implementations, the process 600 can alternatively or additionally include establishing the first wireless communications link responsive to determining that a received signal strength associated with the second wireless communications link is less than a threshold value.

Figure 7:
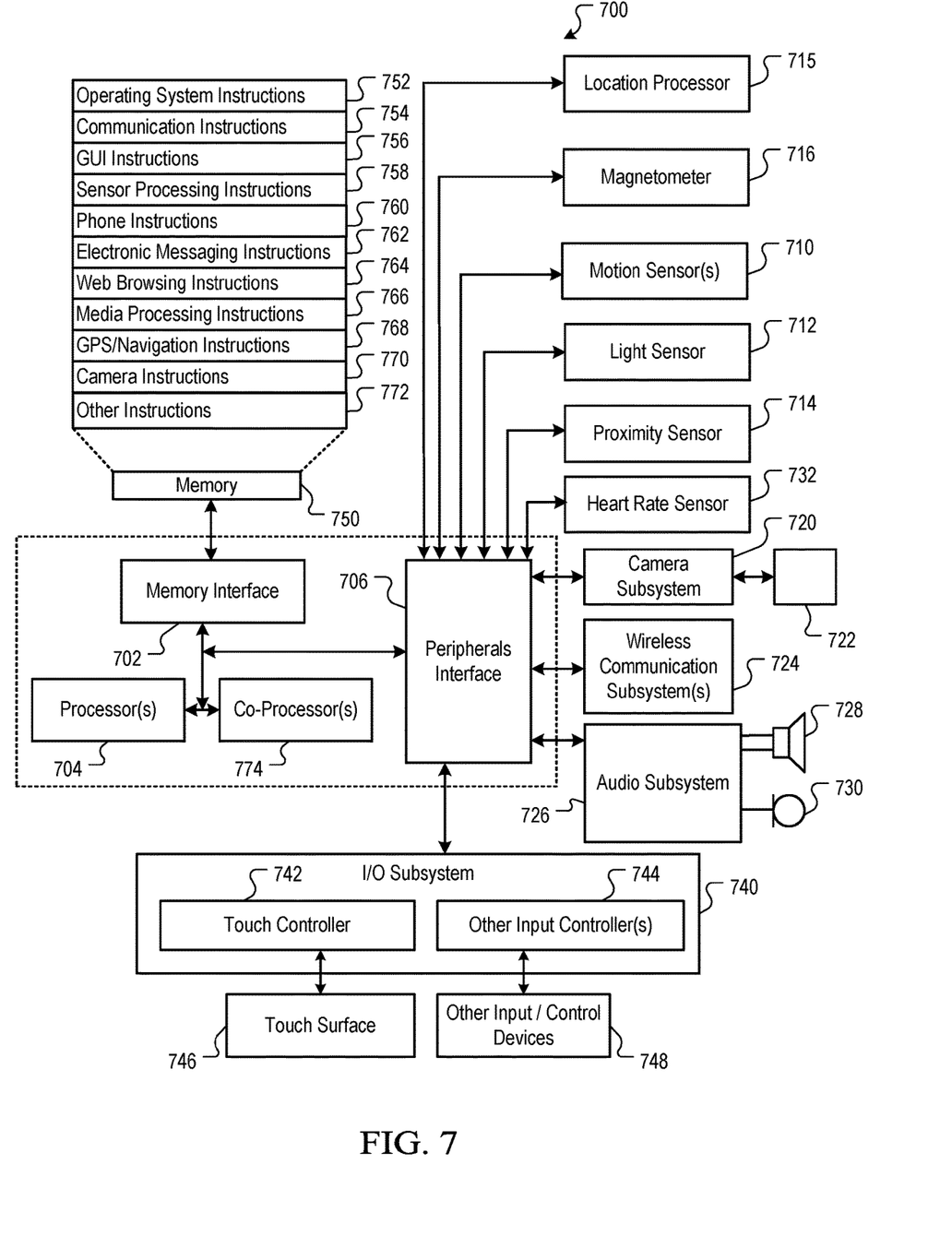
FIG. 7 is a block diagram of an example architecture for implementing the features and processes described in reference to FIGS. 1-6.

FIG. 7 is a block diagram of an example device architecture 700 for implementing the features and processes described in reference to FIGS. 1-6. For example, the architecture 700 can be used to implement the first electronic device 102a and/or the second electronic device 102b. Architecture 700 may be implemented in any device for generating the features described in reference to FIGS. 1-6, including but not limited to desktop computers, server computers, portable computers, smart phones, tablet computers, game consoles, wearable computers, set top boxes, media players, smart TVs, and the like.

The architecture 700 can include a memory interface 702, one or more data processor 704, one or more data co-processors 774, and a peripherals interface 706. The memory interface 702, the processor(s) 704, the co-processor(s) 774, and/or the peripherals interface 706 can be separate components or can be integrated in one or more integrated circuits. One or more communication buses or signal lines may couple the various components.

The processor(s) 704 and/or the co-processor(s) 774 can operate in conjunction to perform the operations described herein. For instance, the processor(s) 704 can include one or more central processing units (CPUs) that are configured to function as the primary computer processors for the architecture 700. As an example, the processor(s) 704 can be configured to perform generalized data processing tasks of the architecture 700. Further, at least some of the data processing tasks can be offloaded to the co-processor(s) 774. For example, specialized data processing tasks, such as processing motion data, processing image data, encrypting data, and/or performing certain types of arithmetic operations, can be offloaded to one or more specialized co-processor(s) 774 for handling those tasks. In some cases, the processor(s) 704 can be relatively more powerful than the co-processor(s) 774 and/or can consume more power than the co-processor(s) 774. This can be useful, for example, as it enables the processor(s) 704 to handle generalized tasks quickly, while also offloading certain other tasks to co-processor(s) 774 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 704 for further analysis.

Sensors, devices, and subsystems can be coupled to peripherals interface 706 to facilitate multiple functionalities. For example, a motion sensor 710, a light sensor 712, and a proximity sensor 714 can be coupled to the peripherals interface 706 to facilitate orientation, lighting, and proximity functions of the architecture 700. For example, in some implementations, a light sensor 712 can be utilized to facilitate adjusting the brightness of a touch surface 746. In some implementations, a motion sensor 710 can be utilized to detect movement and orientation of the device. For example, the motion sensor 710 can include one or more accelerometers (e.g., to measure the acceleration experienced by the motion sensor 710 and/or the architecture 700 over a period of time), and/or one or more compasses or gyros (e.g., to measure the orientation of the motion sensor 710 and/or the mobile device). In some cases, the measurement information obtained by the motion sensor 710 can be in the form of one or more a time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 710 can be directly integrated into a co-processor 774 configured to processes measurements obtained by the motion sensor 710. For example, a co-processor 774 can include one more accelerometers, compasses, and/or gyroscopes, and can be configured to obtain sensor data from each of these sensors, process the sensor data, and transmit the processed data to the processor(s) 704 for further analysis.

Other sensors may also be connected to the peripherals interface 706, such as a temperature sensor, a biometric sensor, or other sensing device, to facilitate related functionalities. As an example, as shown in FIG. 7, the architecture 700 can include a heart rate sensor 732 that measures the beats of a user's heart. Similarly, these other sensors also can be directly integrated into one or more co-processor(s) 774 configured to process measurements obtained from those sensors.

A location processor 715 (e.g., a GNSS receiver chip) can be connected to the peripherals interface 706 to provide geo-referencing. An electronic magnetometer 716 (e.g., an integrated circuit chip) can also be connected to the peripherals interface 706 to provide data that may be used to determine the direction of magnetic North. Thus, the electronic magnetometer 716 can be used as an electronic compass.

A camera subsystem 720 and an optical sensor 722 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 724. The communication subsystem(s) 724 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 724 can depend on the communication network(s) or medium(s) over which the architecture 700 is intended to operate. For example, the architecture 700 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 700 can be configured as a base station for other wireless devices. As another example, the communication subsystems may allow the architecture 700 to synchronize with a host device using one or more protocols, such as, for example, the TCP/IP protocol, HTTP protocol, UDP protocol, and any other known protocol.

An audio subsystem 726 can be coupled to a speaker 728 and one or more microphones 730 to facilitate voice-enabled functions, such as voice recognition, voice replication, digital recording, and telephony functions.

An I/O subsystem 740 can include a touch controller 742 and/or other input controller(s) 744. The touch controller 742 can be coupled to a touch surface 746. The touch surface 746 and the touch controller 742 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 746. In one implementations, the touch surface 746 can display virtual or soft buttons and a virtual keyboard, which can be used as an input/output device by the user.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In some implementations, the architecture 700 can present recorded audio and/or video files, such as MP3, AAC, and MPEG video files. In some implementations, the architecture 700 can include the functionality of an MP3 player and may include a pin connector for tethering to other devices. Other input/output and control devices may be used.

A memory interface 702 can be coupled to a memory 750. The memory 750 can include high-speed random access memory or non-volatile memory, such as one or more magnetic disk storage devices, one or more optical storage devices, or flash memory (e.g., NAND, NOR). The memory 750 can store an operating system 752, such as Darwin, RTXC, LINUX, UNIX, OS X, WINDOWS, or an embedded operating system such as VxWorks. The operating system 752 can include instructions for handling basic system services and for performing hardware dependent tasks. In some implementations, the operating system 752 can include a kernel (e.g., UNIX kernel).

The memory 750 can also store communication instructions 754 to facilitate communicating with one or more additional devices, one or more computers or servers, including peer-to-peer communications. The communication instructions 754 can also be used to select an operational mode or communication medium for use by the device, based on a geographic location (obtained by the GPS/Navigation instructions 768) of the device. The memory 750 can include graphical user interface instructions 756 to facilitate graphic user interface processing, including a touch model for interpreting touch inputs and gestures; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 769 to facilitate GPS and navigation-related processes; camera instructions 770 to facilitate camera-related processes and functions; and other instructions 772 for performing some or all of the processes described herein.

Each of the above identified instructions and applications can correspond to a set of instructions for performing one or more functions described herein. These instructions need not be implemented as separate software programs, procedures, or modules. The memory 750 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining, by one or more processors, that a mobile device is communicatively coupled to a second device by a first wireless communications link and a second wireless communications link different from the first wireless communications link;
   determining, by the one or more processors, that the second wireless communications link is not connected; and
   causing, by the one or more processors and responsive to determining that the second wireless communications link is not connected, the mobile device to attempt to reestablish the second wireless communications link with the second device according to a duty cycle that varies based at least on a characteristic associated with the first wireless communications link.

2. The method of claim 1, wherein the characteristic associated with the first wireless communications link comprises a connection state of the first wireless communications link.

3. The method of claim 2, wherein the duty cycle has a first value when the first wireless communications link is in a connected state and a second value, different from the first value, when the first wireless communications link is in a disconnected state.

4. The method of claim 1, wherein the characteristic of the first wireless communications link comprises a received signal strength value associated with the first wireless communications link.

5. The method of claim 4, wherein the duty cycle has a first value when the received signal strength is greater than a threshold value and a second value when the received signal strength is less than or equal to the threshold value.

6. The method of claim 1, wherein a connection interval of the first wireless communications link is greater than a connection interval of the second wireless communications link.

7. The method of claim 1, wherein a sensitivity level of the first wireless communications link is greater than a sensitivity level of the second wireless communications link.

8. The method of claim 1, wherein an effective communications range of the first wireless communications link is greater than an effective communications range of the second wireless communications link.

9. The method of claim 1, wherein a data redundancy characteristic of the first wireless communications link is greater than a data redundancy characteristic of the second wireless communications link.

10. The method of claim 1, wherein the first wireless communications link comprises a Bluetooth Low Energy Long Range (LE-LR) link or a Bluetooth Low Energy (LE) Coded Physical Layer (PHY) link.

11. The method of claim 10, wherein the second wireless communications link comprises a Bluetooth Low Energy 1 Megabit (LE-1M) link or a Bluetooth Low Energy 2 Megabit (LE-2M) link.

12. The method of claim 1,
   wherein the one or more processors cause the first wireless communications link to be established responsive to determining, by the one or more processors that the mobile device is in motion.

13. The method of claim 1, further comprising:
   establishing the first wireless communications link responsive to determining that a received signal strength associated with the second wireless communications link is less than a threshold value.

14. A system comprising:
   one or more processors; and
   memory storing instructions that when executed by the one or more processors, cause the one or more processors to perform operations comprising:
      determining that a mobile device is communicatively coupled to a second device by a first wireless communications link and a second wireless communications link different from the first wireless communications link;
      determining that the second wireless communications link is no longer connected; and
      causing, responsive to determining that the second wireless communications link is not connected, the mobile device to attempt to reestablish the second wireless communications link with the second device according to a variable duty cycle that varies based at least on a characteristic of the first wireless communications link.

15. The system of claim 14, wherein the characteristic associated with the first wireless communications link comprises a connection state of the first wireless communications link.

16. The system of claim 15, wherein the duty cycle has a first value when the first wireless communications link is in a connected state and a second value, different from the first value, when the first wireless communications link is in a disconnected state.

17. The system of claim 14, wherein the characteristic of the first wireless communications link comprises a received signal strength value associated with the first wireless communications link.

18. The system of claim 17, wherein the duty cycle has a first value when the received signal strength is greater than a threshold value and a second value when the received signal strength is less than or equal to the threshold value.

19. The system of claim 14, wherein the first wireless communications link comprises a Bluetooth Low Energy Long Range (LE-LR) link or a Bluetooth Low Energy (LE) Coded Physical Layer (PHY) link, and
wherein the second Bluetooth link comprises a Bluetooth Low Energy 1 Megabit (LE-1M) link or a Bluetooth Low Energy 2 Megabit (LE-2M) link.

20. One or more non-transitory, computer-readable storage media having instructions stored thereon, that when executed by one or more processors, cause the one or more processors to perform operations comprising:
determining that a mobile device is communicatively coupled to a second device by a first wireless communications link and a second wireless communications link different from the first wireless communications link;
determining that the second wireless communications link is no longer connected; and
causing, responsive to determining that the second wireless communications link is not connected, the mobile device to attempt to reestablish the second wireless communications link with the second device according to a variable duty cycle that varies based at least on a characteristic of the first wireless communications link,
wherein the characteristic associated with the first wireless communications link comprises a connection state of the first wireless communications link,
wherein the duty cycle has a first value when the first wireless communications link is in a connected state and a second value, different from the first value, when the first wireless communications link is in a disconnected state.

* * * * *